Figure 8:
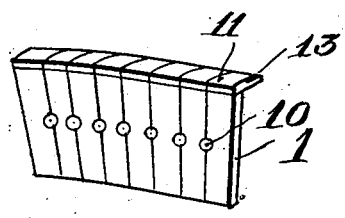

Aug. 17, 1937.                W. R. BENJAMIN                 2,090,097
                  FIREBOX LINING FOR STOVES AND FURNACES
                       Filed Oct. 17, 1936         2 Sheets-Sheet 1
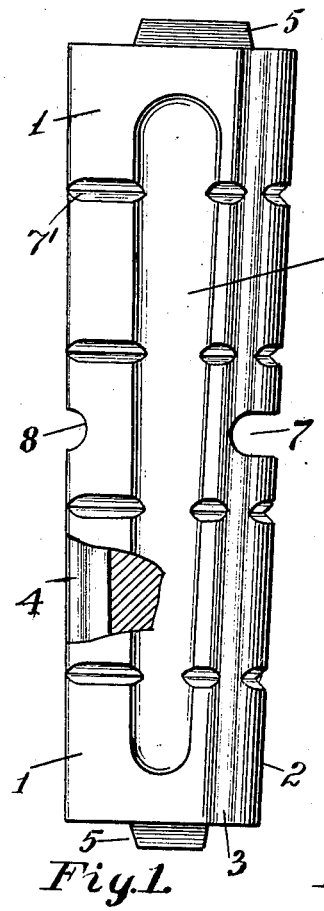
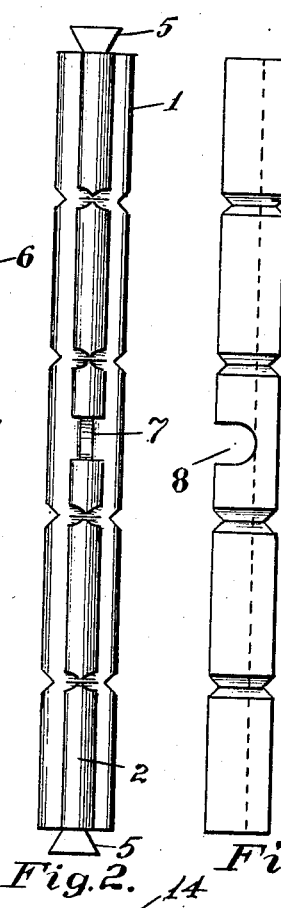
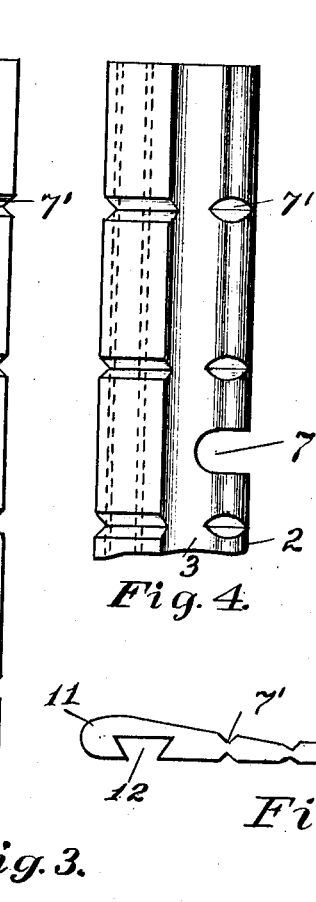
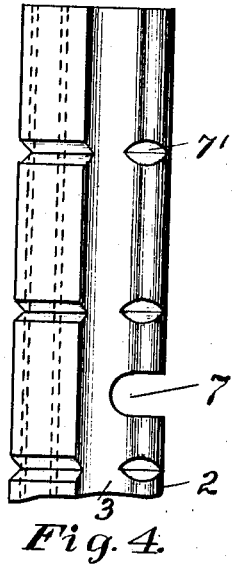
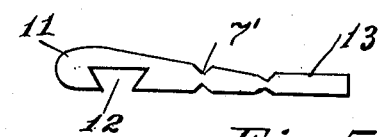
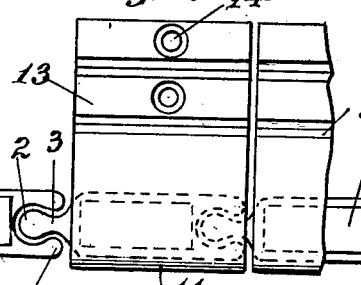
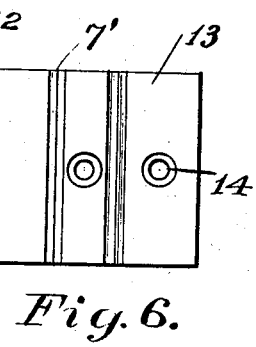
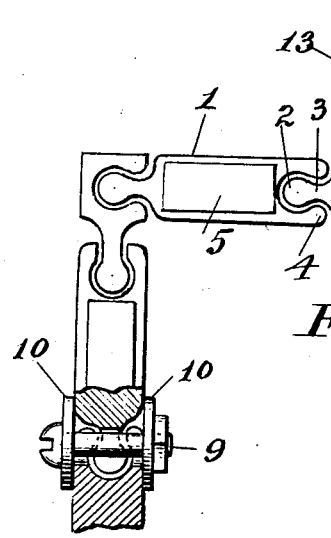
Inventor
Walter R. Benjamin,
By H. M. Plaisted,
Attorney.

Aug. 17, 1937.                W. R. BENJAMIN                2,090,097
                    FIREBOX LINING FOR STOVES AND FURNACES
                         Filed Oct. 17, 1936         2 Sheets-Sheet 2

Inventor
Walter R. Benjamin,
H. M. Plaisted,
By                Attorney.

Patented Aug. 17, 1937

2,090,097

UNITED STATES PATENT OFFICE 2,090,097

FIREBOX LINING FOR STOVES AND FURNACES

Walter R. Benjamin, Granite City, Ill.

Application October 17, 1936, Serial No. 106,084

7 Claims. (Cl. 126—151)

This invention relates to certain new and useful improvements in firebox linings for stoves and furnaces, the peculiarities of which will be hereinafter fully described and claimed.

The main objects of my invention are to provide means first, for a lining that is adjustable to various shapes and sizes of fireboxes in stoves and furnaces, such as rectangular or round; second, for adjusting such a lining to form walls tapering upward, downward, or parallel to each other; third, for arranging such a lining in the desired shape and size, and then locking the multiple members thereof in their assembled position; fourth, for protecting the fireback where the flames go over; fifth, for an efficient and relatively cheap lining for repair or initial use; and other objects and features of construction hereinafter described and claimed.

My lining improvements consist of multiple adjustable members of three design elements, main, corner and apron, which are adapted for assembling in their various shapes and sizes as required for the fireboxes of stoves and furnaces. These parts are of cast iron or other suitable material, and are locked together by suitable means in their assembled position before, or after, placing the same in the respective stove or furnace.

Figure 9:
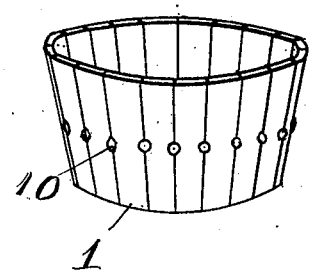
Figure 10:
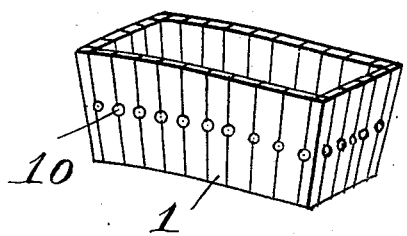
Figure 11:
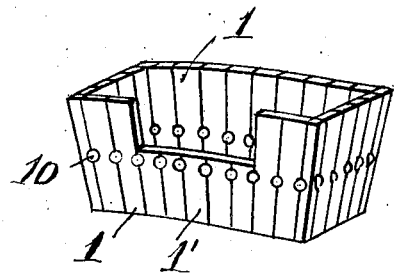
Figure 12:
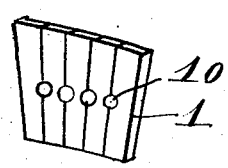

In the accompanying drawings in which like reference numerals indicate corresponding parts, Fig. 1 represents a face view partly in section of the main casting element in my present construction;

Fig. 2, an edge view of the same showing the bulbous interlocking tongue;

Fig. 3, a view of one outer face of the corner casting element;

Fig. 4, a partial view of the other outer face of the same showing the tongue edge;

Fig. 5, a side edge view showing the dovetail groove of the apron casting element;

Fig. 6, a plan view of the apron casting element;

Fig. 7, a plan view of a partial assembly of main, corner and apron elements for a rectangular lining with a section showing a locking bolt and washer gripping the adjacent outer and inner faces of the joint between two main elements;

Fig. 8, an illustrative perspective view of a cook stove fireback and apron assembly;

Fig. 9, a similar view of an assembly of main elements for a round heater or furnace;

Fig. 10, a similar view of a rectangular assembly for a heater or range;

Fig. 11, a similar view to Fig. 10 showing an assembly for a front feed cook stove; and Fig. 12, an assembly for a cook stove end.

Referring to the drawings the numeral 1 designates the main element of my construction consisting of a flat elongated casting having its side edges inclined toward each other as shown in Fig. 1. One side edge has a tongue with a rounded bulbous head 2 on a thin neck portion 3 as shown in Figs. 2 and 7. The other side edge has a rounded matching groove with a contracted opening forming lips 4—4 which loosely engage said neck of the tongue as in Fig. 7, by lengthwise sliding engagement of the members forming a joint. The matching side edges are loosely connected to allow a swinging adjustment of the joint parts in order to assemble them in a circular shape as indicated in Fig. 9.

Said main element has on each end a dovetail projection 5, and is preferably lightened by a coved recess 6 on each side between the thicker side edges in which are formed the respective tongue and groove.

Transverse V-shaped notches 7' are formed in opposite faces of said main element at spaced distances thereon at opposite sides of the coved center portion. The standard full length of this main element can thus be shortened by fracture at one of these transverse grooves.

Thus in forming a lining if a stove with a front feed opening as indicated in Fig. 11, the shortened elements 1' provide such an opening; other location of such shortened elements may be made according to circumstances and the location of the lining.

The inclined sides giving the tapering to such main element, allow of an assembly which is larger at the top and tapers downward as indicated in Figs. 8 to 12 inclusive. An assembly with straight walls can be readily made by disposing said elements with the smaller end up alternating with adjacent elements tapering downward. It is evident that by reversing the assembly it may be disposed with its smaller end upward.

The sliding engagement of the tongue and its matching groove is maintained fixed by notches 7 on the tongue and 8 on the groove side edge of the main element, Fig. 1. When a joint is made with adjacent elements interlocking, these notches match and form an opening through which is passed a bolt 9, Fig. 7, having washers 10 on the opposite faces of the elements at the joint. By tightening the nut the washers are caused to grip upon the adjacent portions of the jointed elements and secure them in their disposed position, whether aligned for a straight wall as in Fig. 7, or swung more or less to form a curved or circular assembly as in Fig. 9.

If a whole firebox is needed and the top opening is large enough to place it in the stove or furnace, it is handiest to assemble the castings outside of the stove and place the whole in at once.

Figs. 5 and 6 show an apron casting consisting of a thickened head portion 11 provided with a dovetail groove 12 adapted to make sliding engagement with said dovetail projection 5 on either end of the main casting. A thin plate portion 13 extends laterally from said head portion so that when the apron is mounted in multiple upon the top of the main castings as indicated in Fig. 7, the thin plate portion 13 will cover the usual space between the wall of the firebox and the back of the stove, thus constituting a fireback where the flames go over; this apron can be used in other places where such a flange is needed, and is provided with V-shaped grooves 7' in upper and lower faces of the plate portion, by which fracture will shorten the plate portion to the space where it is to be used. Fig. 8 also illustrates such a fireback with apron attached.

In making a separate fireback, end, or front piece, and the assembly does not come out right for the space, a corner casting may be added, or the main elements reversed alternately, or otherwise arranged to vary the aligned length of the assembly to match the space where it is to be placed.

In furnaces having deep fireboxes, an assembly such as illustrated in Fig. 9, may be placed one upon the other to fill the spaces.

In practical commercial use of such a firebox such as I have shown and described, I have found the following sizes to be convenient; main castings 1½ inches wide at one end and 1¼ inches at the other, and ½ inch in thickness at the side edges; corner castings are ¾ inch wide; length 7 inches.

In the apron Fig. 6, countersunk holes 14 intermediate of the V-shaped grooves, provide for fastening one or more of said aprons in the desired position in the firebox by wiring to the stove top or post above the oven to hold more rigidly. A furnace cement is advisable to fill up the cracks and crevices in assembled fireboxes as all draft should go up on the inside of the firebox. Almost any stove or furnace can be made serviceable by renewing its lining of my construction, and a comparatively cheap efficient repair can be thus made.

I claim:—

1. A firebox lining having in combination, multiple flat elongated main elements, one side edge of each element having a tongue with a rounded bulbous head on a thin neck portion and the other side edge having a rounded groove with a contracted opening forming lips, said tongue and lips on adjacent elements characterized by notches matching in their engaged joining position forming transverse holes for bolts and washers gripping said joined members to lock them in adjusted position, substantially as described.

2. A firebox lining having in combination, multiple flat elongated main elements having their alternate edges joined by tongue and groove interlocking engagement, means to prevent disengagement of the same, and multiple apron elements slidingly mounted on the ends of said main elements and characterized by dovetail projections from the main elements engaged by dovetail grooves in the apron elements, substantially as described.

3. A firebox lining having in combination, multiple flat elongated main elements and corner elements cooperating therewith, said elements having their alternate edges formed with bulbous tongue and contracted groove respectively making sliding interlocking engagement of adjacent elements, means to prevent disengagement of said joined elements, and multiple apron elements consisting of a thickened head portion and a thinner plate portion mounted on one end of the main elements by sliding engagement characterized by dovetail projections from the main elements interlocking with dovetail grooves in the thick portion of the apron, substantially as described.

4. A firebox lining having in combination, multiple flat elongated main elements having bulbous interlocking tongues and grooves on their respective side edges, and square thickened corner elements each characterized by a bulbous tongue projecting from one side face and a corresponding groove recessed in adjacent side face at right angles to said tongue and respectively interlocking with a matching groove and tongue on adjacent main elements, substantially as described.

5. A firebox lining having in combination, a flat elongated cast main element having a dovetail projection on each end, and having its side edges inclined tapering toward each other, and a flat cast apron characterized by a thickened head portion having a dovetail groove slidingly mounted on an end projection of said main element and having a thin plate portion laterally projecting from the head portion and provided with spaced V-shaped grooves in its upper and lower faces and countersunk holes intermediate of such grooves substantially as described.

6. A firebox lining in rectangular assembly, comprising multiple main elements having bulbous tongues and gripping lips on opposite sides of each element, corner elements having a bulbous tongue on one face and gripping lips on an adjacent face at right angles to said tongue, and fastening means at the joints, substantially as described.

7. A firebox lining in rectangular assembly, comprising multiple flat elongated tapering elements each having interlocking joining edges slidingly engaged, and having a dovetail projection at one end of each element, multiple apron castings each having a head with a dovetail groove fitting said dovetail projection and having a thin lateral projection from one side of said head having transverse V-shaped grooves, and fastening means at the joining edges, substantially as described.

WALTER R. BENJAMIN.